UNITED STATES PATENT OFFICE.

HERBERT HAY HEWITT, OF LONDON, ENGLAND.

MAKING RADIO-ACTIVE BEVERAGES.

1,022,551.  Specification of Letters Patent.  Patented Apr. 9, 1912.

No Drawing.  Application filed March 4, 1911.  Serial No. 612,401.

*To all whom it may concern:*

Be it known that I, HERBERT HAY HEWITT, a subject of the King of England, residing at London, in the county of Middlesex and Kingdom of England, have invented new and useful Improvements in Making Radio-Active Beverages, of which the following is a specification.

This invention relates to a method of rendering mineral or aerated artificial saline waters, cordials, quinin-concoctions, bitters and similar preparations radio-active and producing radio-active compounds therewith which insure practically stable or fixed radium emanations.

It has been noticed by balneologists and physicians that certain natural saline and mineral waters are considerably more efficacious in the treatment of certain diseases than artificially prepared saline and mineral waters even when the exact equivalents or mineral salts or saline substances are dissolved in water or otherwise supplied according to the ordinary methods. This is due to the fact that the customary mechanical preparation of these liquids is not productive of certain constituent elements which are the initial causes of the observed pharmacological effect. It has previously been proposed to supply devices containing radium stone or radium preparations for imparting radio-activity to the contents of such vessels, and in a known apparatus for dispensing radio-active preparations, radio-active substances are used in the form of masses in solid aggregate state consisting of neutral material permeable to emanations, with insoluble radio-active substance incorporated into the same.

It is known that the mineral springs of Karlsbad, Marienbad, Franzensbad, St. Joachimsthal, Bath and other places evolve radio-active emanations and contain in solution radium emanation and it is also known that radio-active crystals are deposited from water of the Karlsbad springs, and from this it may be concluded that the curative action of these waters is largely due to the presence of contained radio-active emanation and hence it may be conjectured that the curative action of artificial saline and mineral waters will be identical with the natural saline and mineral waters and that concoctions and cordials and bitters will have their medical action considerably enhanced by rendering them radio-active or by using for their preparation salts and other substances in which radio-activity has been induced by the action of radium or other radio-active salts, thus producing in some instances a combination or solution of radium or radio-active emanation.

It is known that radium possesses the power of liberating hydrogen and oxygen from water with a consequent condensation of the oxygen molecule. Now I have found that if I pass carbon dioxid under pressure into such radium treated artificial mineral water, a new compound is formed that greatly increases the therapeutic action of the salts contained therein. In this manner the artificial mineral water is rendered radio-active and the radium emanation becomes practically stable or fixed for reasonably long periods. I combine with the aforesaid substances mineral salts such as lithium salts, potash salts, soda salts and so forth, or I may use with the latter definite quantities of finely pulverized soluble or insoluble radio-active substances and then proceed with the carbonating action of the water.

It is authoritatively stated that the presence of radium, an oxidizing agent, contained in natural mineral waters possibly accounts for their efficacy and that these cannot be imitated to produce the same therapeutic effects but as a result of investigations I find that the difficulty can be overcome by first preparing a radio-active water in the usual way either by dissolving a soluble radium salt, 1 milligram in 100 gallons of water, or by making use of radium emanation produced from radium bromid kept in a hermetically sealed container and placed in a volume of water, but preferably I use the insoluble sulfate, or carbonate of radium which I incase in a porous receptacle immersed in the liquid. In this way the emanation is given off slowly and is gradually absorbed by the liquid. To this I add the desired salt such as magnesia, soda, lithia, iron and proceed to charge the liquid with carbonic acid gas under pressure using only half the volume of gas as would be required under ordinary circumstances for the manufacture of aerated waters but I do not restrict myself to this exact volume of gas.

For making radio-active water on a large scale I make use of radio-active pitchblende residue that is to say pitchblende residue containing some of the radio-active substances such as actinium, barium salts and so forth combined with charcoal in the proportion of 1 part of radio-active pitchblende residue to 10 parts of vegetable charcoal using this as a filter. By any of the aforesaid methods a radio-chemical or radio-physical action, induction or affinity is brought about, more especially with the latter named method during the initial stage of the compounds.

I claim:

1. A method of imparting radio-activity to artificial beverages preparations, which consists in the application of carbon dioxid under pressure to radium-treated water in which are dissolved mineral salts so as to produce radio-active compounds in which the radium emanations are practically stable or fixed for reasonably long periods as described.

2. A method of mixing the mineral salts with finely pulverized radio-active substances then introducing same in radium water and carbonating the solutions as described.

HERBERT HAY HEWITT.

Witnesses:
HOWARD JOHN GABSGA,
SEM. MORGAN EVANS.